United States Patent Office 3,003,925
Patented Oct. 10, 1961

---

3,003,925
METHOD OF PRODUCING L-GLUTAMIC ACID BY FERMENTATION
Shukuo Kinoshita, Shigezo Udaka, and Sadao Akita, all of Tokyo, Japan, assignors to Kyowa Hakko Kogyo Co., Ltd., Tokyo, Japan, a corporation of Japan
No Drawing. Filed June 21, 1960, Ser. No. 37,593
Claims priority, application Japan May 17, 1956
15 Claims. (Cl. 195—47)

This invention relates to a method of producing l-glutamic acid by fermentation. Particularly, it relates to a method of producing and accumulating l-glutamic acid in a substantial amount by culturing a strain which belongs to a new species of Micrococcus, named *Micrococcus glutamicus*, in a particular culturing medium under adequate fermentation conditions, and of recovering the same.

It is well known that microorganisms can produce in a suitable medium various kinds of amino acids. The amount produced, however, has been extremely small and it has never been reported that any particular kind of amino acid was accumulated in large quantities in a medium by a fermentation process.

The reason for extreme difficulty in the accumulation of any amino acids in a fermenting medium is that amino acids are the components of proteins, and any amino acid once produced in a medium is apt to be easily resynthesized to proteins, polypeptides or the like, or is apt to be converted or decomposed to other substances by various biochemical reactions. In other words, an amino acid can hardly be accumulated in a culturing medium in the monomeric state. The word "monomeric state" is used in the present specification to mean monomolecular state whether it be a free acid or a salt.

This is the reason why a fermentation process, a direct use of biochemical activities of a living population of microorganism, has never been proposed heretofore for the biosynthesis and accumulation of l-glutamic acid. The known biosynthesis is effected in some enzymatic system, that is, a particular kind of enzyme is extracted from microorganisms, or from some animal or plant tissues, and the enzyme is reacted with suitable substrates e.g. α-ketoglutaric acid and ammonium compounds under a very limited reaction condition.

An object of the present invention is to provide a method for producing directly a substantial amount of l-glutamic acid by culturing a certain microorganism in a liquid medium.

A further object of the present invention is to provide a method for accumulating a large amount of amino acid, particularly l-glutamic acid, in the form of monomeric state by culturing a certain microorganism in a liquid medium.

A further object of the present invention is to provide a method for minimizing any side-reactions such as polymerizing or decomposing of l-glutamic acid that would occur during the cultivation of a certain microorganism in a liquid medium.

A still further object of the present invention is to provide a method of accumulating l-glutamic acid in a liquid medium in the monomeric state, that is, a readily recoverable form.

According to the present invention, a new strain of Micrococcus is cultured in a suitable medium under adequate fermentation conditions, and a substantial amount of l-glutamic acid is accumulated in the medium. A one-step aerobic fermentation, in the form of a reductive amination, produces l-glutamic acid from carbohydrates. The process is industrially and economically feasible. No enzymes are employed.

The inventors have found new strains which are suitable for the present fermentation process. Said strains are actually strains of a new species of a Micrococcus designated *M. glutamicus* and include a strain designated *M. glutamicus* No. 534 (also called Micrococcus No. 534) which was isolated from sewage, and other several strains which were isolated from air or soil. Their microbiological characteristics are stated below. We inventors of the present invention, could not find in Bergey's Manual of Determinative Bacteriology (5th and 6th editions) a species that could be strictly identified with said new species which we have named "*Micrococcus glutamicus*." By ultraviolet irradiation of the strain No. 534, color mutants (No. 613, No. 614) and auxotrophic mutants (No. 601, No. 602) were also obtained.

*M. glutamicus* No. 534 is compared with other micrococci in Table I. In this table we followed to the key of the "Bergey's Manual of Determinative Bacteriology, 6th ed."

As shown in Table I, the species of No. 18 to No. 22 are fundamentally different from *M. glutamicus* No. 534 in their anaerobic character. The species of No. 13 to No. 17 are definitely differentiated from *M. glutamicus* No. 534 in their red pigment production. The species of No. 1 to No. 5 are clearly different from *M. glutamicus* No. 534 in their inability to produce nitrites from nitrates. The species of No. 8 to No. 10 and No. 6 are different in gelatin liquefying character and acid production in milk from *M. glutamicus* No. 534. The species of No. 7, No. 11 and No. 12 are different in acid production in milk from *M. glutamicus* No. 534. The species of No. 8, No. 9a, No. 9b and No. 11 are also different in pigment production.

In addition, the species of No. 6 to No. 8 are differentiated in their ability to utilize ammonium salt as a sole source of nitrogen in Hucker's medium.

TABLE I
*Comparison of M. glutamicus No. 534 with other micrococci*

|  | A | B | C | D | E | F | G | H |
|---|---|---|---|---|---|---|---|---|
| 1. *M. luteus* | + | − | −* |  |  |  |  |  |
| 2. *M. ureae* | + | − | −* |  |  |  |  |  |
| 3. *M. freudenreichii* | + | − | −* |  |  |  |  |  |
| 8. *M. caseolyticus*** | + | − | −* |  |  |  |  |  |
| 4. *M. flavus* | + | − | −* |  |  |  |  |  |
| 5. *M. candidus* | + | − | −* |  |  |  |  |  |

See footnotes at end of table.

TABLE I—Continued

| | A | B | C | D | E | F | G | H |
|---|---|---|---|---|---|---|---|---|
| 6. M. conglomeratus | + | − | + | +* | + | +* | +* | +* |
| 7. M. varians | + | − | + | +* | + | +* | +* | +* |
| 8. M. caseolyticus** | + | − | + | −* | −* | +* | +* | +* |
| 9a. M. pyogenes var. aureus | + | − | + | − | Orange*−* | +* | +* | +* |
| 9b. M. pyogenes var. albus | + | − | + | − | + | +* | +* | +* |
| 10. M. citreus | + | − | + | − | +* | +* | −* | −* |
| 11. M. aurantiacus | + | − | + | − | Orange*−* | ±* | −* | ±* |
| 12. M. epidermidis | + | − | + | − | − | +* | −* | +* |
| 13. M. roseus | + | +* | − | − | − | − | − | − |
| 14. M. cinnabareus | + | +* | − | − | − | − | − | − |
| 15. M. rubens | + | +* | − | − | − | − | − | − |
| 16. M. rhodochrous | + | +* | − | − | − | − | − | − |
| 17. M. agilis | + | − | − | − | − | − | − | − |
| 18. M. aerogenes | −* | − | − | − | − | − | − | − |
| 19. M. assaccharolyticus | −* | − | − | − | − | − | − | − |
| 20. M. niger | −* | − | − | − | − | − | − | − |
| 21. M. grigoroffi | −* | − | − | − | − | − | − | − |
| 22. M. anaerobius | −* | − | − | − | − | − | − | − |
| M. glutamicus No. 534 | + | − | + | − | + | − | − | − |

A—Relation to free oxygen (+: aerobic to facultatively anaerobic, −: anaerobic).
B—Reddish pigment production on agar.
C—Nitrate reduction to nitrite.
D—Ammonium salt utilization as a sole source of nitrogen.
E—Yellow pigment production on agar.
F—Acid production in milk.
G—Gelatin liquefaction.
H—Acid production from lactose.
* Different from M. glutamicus No. 534.
** Two strains of M. caseolyticus are found in Bergey's Manual of Determinative Bacteriology, 6th edition.
Each strain is compared in the Table I. (In the absence of other definition the + and the − indicate the presence and absence, respectively, of the stated characteristic.)

A comparison of l-glutamic acid dehydrogenase activity among various species of genus Micrococcus is given in Table II. A description of experimental methods follows:

(A) *Preparation of l-glutamic acid dehydrogenase from micrococci cells.*—The composition of the culture medium was as follows: meat extract 0.5%, peptone 1.0%, glucose 2.0%, NaCl 0.25%, $K_2HPO_4$ 0.1%, $MgSO_4 \cdot 7H_2O$ 0.25% and yeast extract 0.2%. The pH of the medium was adjusted at 7.0. Organism tested was inoculated in the above medium, and cultured for 20 to 24 hours at 28° C. on a shaking-culture device. After the culture, cells were harvested by centrifugation and washed twice with biological saline water. Washed cells were homogenized by grinding with about twice the amount of fine quartz sands. The homogenate thus obtained was centrifuged for 10 minutes at 10,000 r.p.m. The supernatant was then dialized for 24 hours against M/15 phosphate buffer (pH 7.8) at 0° C. This dializate was used as l-glutamic acid dehydrogenase preparation.

(B) *Assay method for the determination of l-glutamic acid dehydrogenase activity.*—In the assay of l-glutamic acid dehydrogenase activity, method of Olson and Antinsen (J. Biol. Chem. 197, 67 (1952)), was modified. The composition of the test solution was as follows:

0.5 ml. of M/10 l-glutamate solution, 1.0 ml. of coenzyme solution (each 1 μM of TPN and DPN were contained in 1.0 ml. of this solution), and 1.0 ml. of M/15 phosphate buffer, pH 78. At zero time, the above test solution and 1.0 ml. of enzyme preparation were mixed in a Beckmann spectrophotometric cuvette, and the absorbancy at 340 mμ was measured every minute for 6 minutes using Beckmann model DU spectrophotometer. The increase of absorbancy during five minutes after the first one minute was defined as ΔE. ΔE was proportional to the concentration of the enzyme if the increment of absorbancy was lower than 0.070. Specific activity of the enzyme was defined as ΔE/gram of protein in enzyme solution. All the assays were carried out at 30° C.

*Results.*—The results are shown in Table II. As seen in the table, *Micrococcus glutamicus* has considerably higher activity of l-glutamic acid dehydrogenase than other known species of Micrococcus, therefore *M. glutamicus* is easily distinguishable from other species.

TABLE II

*Comparative activities of l-glutamic acid dehydrogenase in various species of genus Micrococcus*

| Strain: | Specific activity (ΔE/gr. of protein) |
|---|---|
| M. epidermidis ATCC 155 | 1.4 |
| M. lysodeiticus ATCC 4698 | Trace |
| M. varians ATCC 399 | 6.0 |
| M. citreus ATCC 4012 | 3.0 |
| M. caseolyticus ATCC 8460 | Trace |
| M. sodonensis Aaronson | Trace |
| M. conglomeratus Migula | 28.0 |
| M. pyogenes var. albus Schroeter | Trace |
| M. flavus ATCC 10240 | 75.0 |
| M. glutamicus No. 534 | 560.0 |
| M. glutamicus No. 541 | 531.0 |
| M. glutamicus No. 560 | 434.0 |
| M. glutamicus No. 588 | 570.0 |
| M. glutamicus No. 582 | 380.0 |

The characteristics of *Micrococcus glutamicus*, represented by *Micrococcus glutamicus* No. 534 (ATCC No. 13032), will now be described in detail. The experimental tests were done according to the methods described in the Descriptive Chart of "Manual of Methods for Pure Culture Study of Bacteria," published by the Society of American Bacteriologists (9th edition), 1950.

Its morphological and physiological characters are as follows:

Slightly ellipsoidal spheres, usually in pairs, but also in single and irregular masses. Size of majority: 0.6–1.2 microns. Elongated forms are seen in some conditions. Not motile, spores are not formed. Gram-positive.

Agar slant: Moderate growth, filiform, dull, pale yellow.

Agar colonies: Circular, smooth, perfect, slightly elevated, pale yellow.

Broth: Slightly turbid, rings are seen sometimes along tube. Flocculent sediment, no odor.

Litmus milk: No change or slightly alkaline.

Gelatin stab: No liquefaction or very faint liquefaction.

Hydrogen sulfide not formed.

Indole not produced.

Starch not hydrolyzed.

Nitrites produced from nitrates.

Catalase-positive.
Urease produced.
Phosphatase-negative.
Voges-Proskauer reaction: Negative to very weak.
$NH_4H_2PO_4$ is not utilized as a sole source of nitrogen in Hucker's medium.
Citrate utilization in Koser's medium is negative.
Casein dissimilation: Negative or very weak.
Reduction of dyes: Methylene-blue, 2,6-dichlorophenol-indophenol, Janus green and 2,3,5-triphenyltetrazolium chloride are reduced.
Methyl-red test: Weakly acidic.
Temperature relations: No growth at 47° C., very slight growth at 42° C., good growth at 28–37° C. Optimum temperature is about 30° C.
Optimum pH, between 7 and 8. Growth occurs between 6 and 9.
Acid from glucose, fructose, mannose, sucrose and maltose. No acid from lactose. (See Table III.)
L-glutamic acid is accumulated in a large quantity aerobically in the presence of carbohydrates, ammonium ion and inorganic salts.
Production of organic acid: α-ketoglutaric acid and lactic acid are produced in glucose media.
Aerobic.
Habitat: Air, soil and sewage.
Reference is made to the paper entitled "Taxonomical Study of Glutamic Acid Accumulating Bacteria, *Micrococcus glutamicus* nov. sp." by S. Kinoshita, K. Nakayama and S. Akita. This manuscript was received by the editorial board of "Bulletin of the Agricultural Chemical Society of Japan," December 1957 (Faculty of Agriculture, University of Tokyo).

TABLE III

*Acid production from carbohydrates by* M. glutamicus *No. 534*

| Carbohydrates | Agar medium | Liquid medium** | Carbohydrates | Agar medium | Liquid medium** |
|---|---|---|---|---|---|
| Inositol | − | ± | Melezitose | − | − |
| Arabinose | − | ± | Starch | − | − |
| Rhamnose | − | − | Inulin | − | − |
| Xylose | − | ± | Dextrin | − | − |
| Glucose | + | + | Glycogen | − | − |
| Fructose | + | + | Glycerol | − | − |
| Galactose | − | − | Erythritol | − | − |
| Mannose | + | + | Adonitol | − | − |
| Lactose | − | − | Mannitol | −* | ±* |
| Sucrose | + | + | Sorbitol | − | − |
| Maltose | + | + | Dulcitol | − | − |
| Trehalose | −* | − | Salicin | −* | − |
| Melibiose | − | − | Aesculin | − | − |
| Cellobiose | − | − | α-Methylglucoside | − | − |
| Raffinose | − | − | | | |

+: Acid is produced; −: Acid is not produced; ±: Acid production is doubtful.
*Acid is produced by some other strains of *M. glutamicus*.
**The composition of liquid medium is as follows: peptone 2%, carbohydrate to be tested 1%, distilled water. To 1000 ml. of this solution, 1 ml. of 1.2% bromcresol purple alcohol (95%) solution was added before sterilization. pH of the medium was adjusted to neutrality using NaOH solution.

In view of the above properties and observations, the inventors recognized that the present strain belonged to a new species of the genus of Micrococcus, because there was none which could be identified with any one in the aforementioned Bergey's Manual.

The reasons will now be described in detail. On comparing with Bergey's Manual of Determinative Bacteriology (6th edition) our new species, *Micrococcus glutamicus*, seems most closely related to *Micrococcus aurantiacus* and *Micrococcus epidermidis*, but differs from said known species as set forth in Table IV.

TABLE IV

*Comparison of* M. glutamicus *No. 534 with* M. aurantiacus *and* M. epidermidis

| Media | M. aurantiacus | M. epidermidis | M. glutamicus No. 534 |
|---|---|---|---|
| Milk | Weakly acidic | Produces acid | No change to slightly alkaline. |
| Lactose | Produces acid | do | Does not produce acid. |
| Nutrient broth | Turbid with pellicle. | Turbid with white ring and sediment. | Slightly turbid, rings are seen sometimes along tube. Flocculent sediment. |
| Nutrient agar | Buff to scant orange-yellow beaded growth, raised, glistening. | White | Moderate growth, milky white to pale yellow. |
| Habitat | Usually isolated from infections but also found in milk, cheese and dust. | Skin and mucous membranes. | Air, soil, sewage. |

As for l-glutamic acid productivity, *Micrococcus glutamicus* has a remarkable productivity on the culturing medium specified in the examples which will be described later, while *Micrococcus epidermidis* has no such l-glutamic acid productivity. In serological natures also, precipitation test reveals that our new species is different from other species.

There is found no species which is identical with *Micrococcus glutamicus* in Bergey's Manual of Determinative Bacteriology (6th edition).

Strains of our new species other than *Micrococcus glutamicus* No. 534 also have the same properties as the latter.

Any culturing medium as shown in the examples, nitrogen sources, inorganic substances, etc., may be used, regardless of whether synthetic or organic.

The sugar and nitrogen source may be of any kind, provided that they are utilizable for the strain employed. As for the sugar, glucose, fructose, mannose, sucrose, maltose, starch acid-hydrolyzate, molasses etc., as enumerated hereinabove, may be used separately or in combinations of two or more.

As for the nitrogen source, ammonia, urea, ammonium chloride, ammonium acetate or other inorganic or organic ammonium salts, peptone, NZ amine (enzymatic hydrolyzate of casein manufactured by Sheffield Chemical Co), meat extract, corn steep liquor, casein hydrolyzate, fish meal or its digested product, soybean meal or its digested product etc., may be used.

The culturing temperature may be 28° C. to 33° C. Either shaking culture or submerged culture with aeration and agitation is effected at pH 6 to 9 for a period of 2 to 5 days.

After the complete fermentation the cells are removed and the fermentation filtrate is concentrated under reduced pressure. The concentrate thus obtained is adjusted to pH 3.2 with 5 N HCl and then left standing in a cold room to obtain crude crystals of l-glutamic acid.

As anyone skilled in the art will readily understand, to use mutants of the present strain is also within the scope of the present invention.

The l-glutamic acid or its salt accumulated in the medium is recovered by a known suitable process, such as ion exchange resin method, such a process per se being no significant part of the present invention.

The present invention will be illustrated by the following examples, which are given merely for illustration.

EXAMPLE 1.—CULTURING BY SYNTHETIC MEDIUM

*Micrococcus glutamicus* No. 534 was cultured for 24 hours in glucose bouillon by shaking culture at 28° C. and used as inoculum. 30 ml. of fermentation medium was distributed in a 250 ml. flask and inoculated with above inoculum and shaken by a rotary shaker at 220 r.p.m. The composition of the fermentation medium was as follows: 50 gr. glucose, 8 gr. urea, 0.5 gr. $K_2HPO_4$, 0.1 gr. $MgSO_4 \cdot 7H_2O$ and 5 mgr. $FeCl_3 \cdot 6H_2O$ per 1 liter (the unaccounted for portion of the liter consisted of water); pH being about 7.5. Submerged cultures with aeration and agitation were effected at both 33° C. and 28° C.

The pH was controlled during the fermentation by the addition of urea.

The analytical results during fermentation are given in Table V.

TABLE V

| Culturing temp., °C. | Culturing duration, days | pH | Residual glucose, gr./100 ml. | l-Glutamic acid, mgr./100 ml. | Yield based on consumed glucose, percent |
|---|---|---|---|---|---|
| 33 | 1 | 8.6 | 2.8 | 660 | 30.0 |
|    | 2 | 7.3 | 1.9 | 700 | 22.0 |
| 28 | 2 | 8.2 | 2.3 | 610 | 22.6 |
|    | 3 | 6.8 | 1.2 | 810 | 21.3 |
|    | 4 | 8.7 | 0.2 | 1,130 | 23.5 |

After two-day culture at 33° C. the cells were removed from the fermentation broth and 1 l. of the filtrate was concentrated under reduced pressure.

This concentrate was adjusted to pH 3.2 with 5 N HCl and left standing in a cold room, whereby 6.3 g. of l-glutamic acid crude crystals were obtained. By four-day culture at 28° C., 10.4 gr. of l-glutamic acid crude crystals were obtained from 1 l. of the fermentation filtrate in a similar manner.

EXAMPLE 2.—CULTURING BY ORGANIC MEDIUM

Inoculum and procedures were same as in Example 1. The fermentation medium was as follows: 100 gr. glucose, 5 gr. meat extract, 5 gr. NZ amine, 15 gr. urea, 1 gr. $K_2HPO_4$ and 0.25 gr. $MgSO_4 \cdot 7H_2O$ per 1 liter (the unaccounted for portion of the liter consisting of water); pH being about 7.0. Submerged culture with aeration and agitation was effected at 28° C.

The analytical results during fermentation are given in Table VI.

TABLE VI

| Culturing duration, days | pH | Residual sugar, gr./100 ml. | l-Glutamic acid, mgr./100 ml. | Yield based on consumed sugar, percent |
|---|---|---|---|---|
| 1 | 8.4 | 7.2 | 370 | 13.6 |
| 2 | 8.2 | 5.5 | 1,280 | 28.4 |
| 3 | 7.3 | 3.5 | 1,960 | 30.1 |
| 4 | 6.2 | 2.9 | 2,480 | 34.9 |

The above examples are only illustrative and various other saccharine materials, for example fructose, sucrose, maltose, xylose and starch acid-hydrolyzate, and various other organic and inorganic nitrogenous sources such as, for example, as ammonia, ammonium salts such as ammonium chloride, ammonium sulphate, ammonium carbonate, ammonium acetate and the like, peptone, digested soybean meal, digested fish meal, casein hydrolyzate, and corn steep liquor etc. are usable in place of the nutrient materials in the fermentation medium mentioned in Example 2.

As will be clear from the above descriptions, in a synthetic medium as well as in an organic medium, an amount as high as 20–30% of consumed sugar can be converted to l-glutamic acid.

In order to control the pH value of the culturing medium within a range from 6 to 9, neutralizing agents such as ammonia, urea, compounds containing basic nitrogenous radical [$NH_4OH$, $(NH_2)_2CO$, $(NH_4)_2CO_3$, etc.], and caustic alkalis [NaOH, etc.] may be used.

Various combinations of saccharine materials, nitrogen sources and pH control agents are contemplated for the culturing in both synthetic and organic media and the specific examples are merely illustrative and are not to be considered limitative with respect to particular materials employed except for the presence of *Micrococcus glutamicus*.

Further illustrative of the instant invention are the following examples:

EXAMPLE 3

Fermentation medium was prepared as follows: 50 gr. of glucose, 8 gr. of urea, 0.5 gr. of $K_2HPO_4$, 0.1 gr. of $MgSO_4 \cdot 7H_2O$ and 5 mgr. of $FeCl_3 \cdot 6H_2O$ were dissolved in tap water and made up to 1 liter. The pH of the medium was approximately 7.5. Each 30 ml. of this medium was distributed in 250 ml. Erlenmeyer flasks and autoclaved at 110° C. for 10 minutes. To one flask of this sterilized medium, 3 ml. of inoculum of *Micrococcus glutamicus* No. 534, which was grown in glucose-bouillon medium on shaking culture device at 28° C. for 24 hours, were added. Fermentation was carried out on a shaking culture device at 28° C. During the fermentation, the pH of the medium was maintained at from 6 to 9 by adding 0.5 to 1.0 ml. of 10% $NH_4OH$ at each 4 to 6 hour interval. After 4 days, the culture medium was centrifuged and bacterial cells were removed. l-Glutamic acid content of the supernatant was 11.3 mg. per ml. according to the enzymatic determination using l-glutamic acid decarboxylase. The supernatant was concentrated in vacuo to ⅕ of the original volume and the pH of this concentrate was adjusted to 3.2 with 5 N HCl. This solution was left to stand in cold-room until a substantial amount of crude l-glutamic acid crystallized. From 1 liter of the fermented medium, 10.4 gr. of crude l-glutamic acid was obtained.

EXAMPLE 4

The process described in Example 3 was repeated using urea as a neutralizing agent. During the fermentation, the pH of the medium was maintained at from 6 to 9 by adding 0.5 ml. of 10% urea solution at 4 to 6 hour intervals. After 4 days, the l-glutamic acid content in the culture medium reached 13.2 mgr./ml. From 1 liter of this culture medium, 11.5 gr. of crude l-glutamic acid was obtained.

EXAMPLE 5

The process described in Example 3 was repeated using $(NH_4)_2CO_3$ as a neutralizing agent. During the culture, the pH of the medium was adjusted at 6 to 9 by adding 0.5 ml. of 10% $(NH_4)_2CO_3$ at 4 to 6 hour intervals. After 4 days' culture, the culture medium was found to contain 12.0 mgr. of l-glutamic acid per ml.

EXAMPLE 6

The process described in Example 3 was repeated using 50 gr. of fructose in place of glucose. As a neutralizing agent, 10% urea solution was used as described in Example 4. After 5 days' culture, the culture medium was found to contain 7.2 mgr. of l-glutamic acid per ml.

EXAMPLE 7

The process described in Example 3 was repeated using 50 gr. of sucrose in place of glucose. As a neutralizing agent, 10% urea solution was used as described in Example 4. After 5 days' culture, the culture medium was found to contain 8.5 mgr. of l-glutamic acid per ml.

EXAMPLE 8

The process described in Example 3 was repeated using 50 gr. of maltose in place of glucose. After 4 days' culture, the culture medium was found to contain 10.8 mgr. of l-glutamic acid per ml.

EXAMPLE 9

The process described in Example 3 was repeated using starch acid-hydrolyzate which was equivalent to 50 gr. of glucose, and 10% (NH$_4$)$_2$CO$_3$ solution was used as a neutralizing agent. After 3 days' culture, the culture medium was found to contain 12.8 mgr. of l-glutamic acid per ml.

EXAMPLE 10

The process described in Example 3 was repeated using the following medium: 100 gr. of glucose, 5 gr. of meat extract, 5 gr. of NZ amine, 5 gr. of urea, 1 gr. of K$_2$HPO$_4$, and 0.24 gr. of MgSO$_4$·7H$_2$O were dissolved in tap water and made up to 1 liter. The pH of the medium was around 7.0. After sterilization and cooling, the medium was inoculated with the same organism and the submerged culture with aeration and agitation was effected at 28° C. During the culture, the pH of the medium was adjusted at from 6 to 9 with 10% urea solution as described in Example 4. After 4 days' culture, the culture medium was found to contain 24.8 mgr. of l-glutamic acid per ml.

EXAMPLE 11

The process described in Example 10 was repeated using 15 gr. of (NH$_4$)$_2$SO$_4$ in place of 5 gr. of urea and employing 4% NaOH solution as a neutralizing agent. After 3 days' culture, the culture medium was found to contain 19.0 mgr. of l-glutamic acid per ml.

EXAMPLE 12

The process described in Example 10 was repeated at temperature of 32° C. instead of 28° C. After 4 days' culture, the culture medium was found to contain 22.4 mgr. of l-glutamic acid per ml.

EXAMPLE 13

The process described in Example 4 was repeated using *Micrococcus glutamicus* No. 613 (ATCC No. 13059, a white color mutant of *M. glutamicus* No. 534). After 4 days' culture, the medium was found to contain 9.5 mgr. of l-glutamic acid per ml.

EXAMPLE 14

The process described in Example 4 was repeated using *Micrococcus glutamicus* No. 614 (ATCC No. 13060, a yellow mutant of *M. glutamicus* No. 534). After 4 days' culture, the medium was found to contain 9.2 mgr. of l-glutamic acid per ml.

Mutant strains can be obtained by the irradiation of ultraviolet light on *M. glutamicus* No. 534. Two colored mutants (white and yellow types), and several auxotrophic mutants were obtained. From natural source many strains which conformed to the same species of *M. glutamicus* were isolated. The characters of some of those strains are tabulated in the Table VII. Each of the listed strains such as *M. glutamicus* No. 541, No. 560, No. 582, No. 588, No. 613 (ATCC No. 13059), No. 614 (ATCC No. 13060), No. 601 and No. 602 may be cultured in place of *M. glutamicus* No. 534 in each of the examples (1 to 14, inclusive), to produce l-glutamic acid in a culturing medium. The saccharine materials, the nutrient materials and pH controlling agents may vary as set forth in columns 7 and 8.

TABLE VII

Micrococcus glutamicus *and its mutants*

| Strain | Source of isolation | Comparative characters | | | |
|---|---|---|---|---|---|
| | | Specific activity, Δ E/gr. | Color | Optimum temperature (° C.) | Amino-acid requirement |
| *M. glutamicus:* | | | | | |
| No. 534 | Sewage | 560 | Normal | 28–30 | None. |
| No. 541 | Monocolony isolation of No. 534 | 531 | ___do___ | 28–30 | Do. |
| No. 560 | Air | 434 | ___do___ | 30–33 | Do. |
| No. 582 | Soil | 380 | ___do___ | 30–33 | Do. |
| No. 588 | Animal feces | 570 | ___do___ | 30–33 | Do. |
| No. 613 | U.V. mutant of No. 534 | | White | 28–30 | Do. |
| No. 614 | ___do___ | | Yellow | 28–30 | Do. |
| No. 601 | ___do___ | | Normal | 28–30 | Methionine. |
| No. 602 | ___do___ | | ___do___ | 28–30 | Histidine. |

EXAMPLE 15.—RECOVERY OF GLUTAMIC ACID FROM GLUTAMIC ACID WHOLE BROTH

To 2 liters of glutamic acid broth produced by the method of Example 3 and having an initial pH of 8.1, 10 gms. of aluminum sulfate contained in 5% solution was added. The pH of the solution dropped to 7.65. The pH was adjusted to 3.4 by adding 28.5 ml. of concentrated sulfuric acid. At this point an assay was done which showed 50.74 g. of glutamic acid per liter of broth.

The broth was then coagulated at 87° C. for a period of 5 hours and 20 minutes. 40 g. of Super-Cel were then added as admix, and the slurry containing Super-Cel and broth was then filtered through No. 4A porcelain funnel having 40 g. of Super-Cel precoat on it. The filtered cake was washed with three 125 ml. portions of water, the water being at a temperature of 80° C. The filtration was rapid. The volume of the filtered broth was 2,380 ml. The filtered broth contained 36.95 g. of glutamic acid per liter. The filtration yield was 86.6%. The filtered broth was then concentrated under reduced pressure to 650 ml. thereby causing the glutamic acid concentration to be 150 grams per liter. The concentrated filtered broth was then aged at 5° C. for a period of approximately 20 hours. During this aging period the broth was agitated. At the end of the aging period, the broth was filtered and the precipitate was washed with four 54 ml. portions of water, the water being at a temperature of between 0 and 5° C. The washed precipitate was then air dried. The weight of washed precipitate was 65.5 gm. This was equivalent to 61.67 grams of pure glutamic acid, since the purity of the washed precipitate was 94.6%.

*Micrococcus glutamicus* No. 534 (ATCC No. 13032) is a strain of a new species belonging to the genus Micrococcus. This is shown below with reference to the "Key to the species of genus Micrococcus" as set forth in Bergey's Manual of Determinative Bacteriology.

I. "Key to the species of genus Micrococcus" from Bergey's Manual, 6th Edition:

(1) Aerobic to facultatively anaerobic species.
  *M. glutamicus* No. 534 is aerobic.
  B. Nitrites produced from nitrates.
    *M. glutamicus* No. 534 produces nitrites from nitrates.

(2) Do not utilize NH₄H₂PO₄ as a sole source of nitrogen.

*M. glutamicus* No. 534 conforms to this description.

aa. Gelatin not liquefied or very slowly liquefied. *M. glutamicus* No. 534 conforms to this description.

In this section, 2 species namely *M. aurantiacus* and *M. epidermidis* are included.

*M. glutamicus* is compared with and differentiated from *M. aurentiacus* and *M. epidermidis* in Table IV. As shown in said table, *M. glutumicus* No. 534 is different from those two species in pigment on agar, acid production in milk and acid production from lactose.

In addition, in *M. epidermidis*, Voges-Proskauer reaction is positive although in *M. glutamicus* No. 534 this reaction is negative. This reaction is an important character according to C. Shaw, J. M. Stit and S. T. Cowan (J. Gen. Microbiol. 5, 1010, 1951).

II. "Key to the genera of family Micrococcaceae" from Bergey's Manual, 7th edition, by Breed, Robert S.; Murray, E.G.D.; and Smith, Nathan R.; published by The Williams & Wilkins Company in Baltimore, Maryland; October, 1957:

(1) Aerobic to facultatively anaerobic species. Also includes some obligate anaerobes that occur in packets (Sarcina).

*M. glutamicus* No. 534 is aerobic.

A. Cells are generally found in irregular masses; occasionally they are single or in pairs.

*M. glutamicus* No. 534 conforms to this description.

(1) Action on glucose, if any, is oxidative. Aerobic. *M. glutamicus* No. 534 is aerobic. Therefore, *M. glutamicus* No. 534 belongs to genus I. *Micrococcus*.

According to the "Key to the species of genus Micrococcus" in Bergey's Manual, 7th ed:

(1) May or may not reduce nitrates to nitrites No free nitrogen or nitrous oxide gas produced from nitrates.

*M. glutamicus* No. 534 conforms to this key.

A. No pink or red pigment produced on agar media in young cultures. *M. glutamicus* No. 534 conforms to this key.

(2) Nitrites produced from nitrates. *M. glutamicus* No. 534 produces nitrites from nitrates.

In this section, no species is described which does not utilize NH₄H₂PO₄ as a sole source of nitrogen. *M. glutamicus* No. 534 does not utilize NH₄H₂PO₄ as a sole source of nitrogen. So, it is clear that *M. glutamicus* No. 534 is different from any species listed in Bergey's Manual, 7th ed. That means *M. glutamicus* is a new species.

The classification of *Micrococcus glutamicus* No. 534 is dependent upon the conditions under which the culture is grown, the criteria considered dominant in establishing the genus, and the classification scheme accepted by the taxonomist. Other investigators may classify the same organism as either a Micrococcus, a Brevibacterium, a Corynebacterium or a Bacterium.

It is thought that the invention and its advantages will be understood from the foregoing description, and it is apparent that various changes may be made in the process without departing from the spirit and scope of the invention or sacrificing its material advantages, the process hereinbefore described being merely illustrative of preferred embodiments of the invention.

This application is a continuation-in-part of copending application Serial No. 714,068, filed February 10, 1958 and now abandoned, which is a continuation-in-part of Serial No. 624,198, filed November 26, 1956, and now abandoned.

Having thus disclosed the invention what is claimed is:

1. A method for producing l-glutamate selected from the group consisting of l-glutamic acid and a salt thereof which comprises aerobically culturing *Micrococcus glutamicus* in a culturing medium containing carbohydrate, nitrogen source and inorganic material, controlling the pH value of the culturing medium within the range of from about 6 to about 9 by the addition of neutralizing agent, whereby a substantial amount of l-glutamate is accumulated in the culturing medium, and recovering said l-glutamate.

2. A method of producing l-glutamate selected from the group consisting of l-glutamic acid and a salt thereof which comprises culturing *Micrococcus glutamicus* under aerobic conditions in a culturing medium containing a fermentable carbon source, a nitrogen source and inorganic material, and controlling the pH value of the culturing medium during said culturing within the range of from 6 to 9 by the addition thereto of neutralizing agent, whereby a substantial amount of l-glutamate is accumulated in the culturing medium.

3. A method of producing a compound having an l-glutamate radical which comprises culturing *Micrococcus glutamicus* under aerobic conditions in a culturing medium containing carbohydrate, nitrogen source and inorganic material, and controlling the pH value of the culturing medium during said culturing within the range of from about 6 to about 9 by the addition thereto of neutralizing agent, whereby a substantial amount of said compound having an l-glutamate radical is accumulated in the culturing medium.

4. A method of producing a compound having an l-glutamate radical which method comprises culturing *Micrococcus glutamicus* under aerobic conditions in a culturing medium containing (1) at least one carbohydrate selected from the group consisting of glucose, fructose, sucrose, maltose, xylose and starch acid-hydrolyzate, (2) nitrogen source, and (3) inorganic material; controlling the pH value of the culturing medium during said culturing within the range from about 6 to about 9 by the addition thereto of neutralizing agent, whereby a substantial amount of the compound having an l-glutamate radical is accumulated in the culturing medium; and recovering said compound.

5. A method of producing a compound having an l-glutamate radical which method comprises culturing *Micrococcus glutamicus* under aerobic conditions in a culturing medium containing (1) carbohydrate, (2) at least one nitrogen source selected from the group consisting of urea, ammonia, ammonium salt, peptone, corn steep liquor, hydrolyzed casein, fish meal, meat extract and digested soybean meal, and (3) inorganic material; controlling the pH value of the culturing medium during said culturing within the range from about 6 to about 9 by the addition thereto of neutralizing agent, whereby a substantial amount of the compound having an l-glutamate radical is accumulated in the culturing medium; and recovering said compound.

6. A method of producing a compound having an l-glutamate radical which method comprises culturing *Micrococcus glutamicus* under aerobic conditions in a culturing medium containing carbohydrate, nitrogen source and inorganic material; controlling the pH value of the culturing medium during said culturing within the range from about 6 to about 9 by the addition thereto of ammonia, whereby a substantial amount of the compound having an l-glutamate radical is accumulated in the culturing medium; and recovering said compound.

7. A method of producing a compound having an l-glutamate radical which method comprises culturing *Micrococcus glutamicus* under aerobic conditions in a culturing medium containing carbohydrate, nitrogen source and inorganic material; controlling the pH value of the culturing medium during said culturing within the range from about 6 to about 9 by the addition thereto of urea, whereby a substantial amount of the compound having an l-glutamate radical is accumulated in the culturing medium; and recovering said compound.

8. A method of producing a compound having an l-glutamate radical which method comprises culturing *Micrococcus glutamicus* under aerobic conditions in a culturing medium containing carbohydrate, nitrogen source and inorganic material; controlling the pH value of the culturing medium during said culturing within the range from about 6 to about 9 by the addition thereto of neutralizing agent containing a basic nitrogenous radical, whereby a substantial amount of the compound having an l-glutamate radical is accumulated in the culturing medium; and recovering said compound.

9. A method of producing a compound having an l-glutamate radical which method comprises culturing *Micrococcus glutamicus* under aerobic conditions in a culturing medium containing carbohydrate, nitrogen source and inorganic material; controlling the pH value of the culturing medium during said culturing within the range from about 6 to about 9 by the addition thereto of caustic alkali, whereby a substantial amount of the compound having an l-glutamate radical is accumulated in the culturing medium; and recovering said compound.

10. A method of producing a compound having an l-glutamate radical which comprises culturing a mutant of *Micrococcus glutamicus* under aerobic conditions in a culturing medium containing carbohydrate, nitrogen source and inorganic material; controlling the pH value of the culturing medium during said culturing within the range of from about 6 to about 9 by the addition thereto of neutralizing agent, whereby a substantial amount of said compound having an l-glutamate radical is accumulated in the culturing medium; and recovering said compound.

11. A method of producing a compound having an l-glutamate radical which comprises culturing a microorganism corresponding to ATCC No. 13059 under aerobic conditions in a culturing medium containing carbohydrate, nitrogen source and inorganic material; controlling the pH value of the culturing medium during said culturing within the range of from about 6 to about 9 by the addition thereto of neutralizing agent, whereby a substantial amount of said compound having an l-glutamate radical is accumulated in the culturing medium; and recovering said compound.

12. A method of producing a compound having an l-glutamate radical which comprises culturing a microorganism corresponding to ATCC No. 13060 under aerobic conditions in a culturing medium containing carbohydrate, nitrogen source and inorganic material; controlling the pH value of the culturing medium during said culturing within the range of from about 6 to about 9 by the addition thereto of neutralizing agent, whereby a substantial amount of said compound having an l-glutamate radical is accumulated in the culturing medium; and recovering said compound.

13. A method of producing a compound having an l-glutamate radical which comprises culturing a microorganism corresponding to ATCC No. 13032 under aerobic conditions in a culturing medium containing carbohydrate, nitrogen source and inorganic material; controlling the pH value of the culturing medium during said culturing within the range of from about 6 to about 9 by the addition thereto of neutralizing agent, whereby a substantial amount of said compound having an l-glutamate radical is accumulated in the culturing medium; and recovering said compound.

14. A one-step method of directly producing, by reductive amination, l-glutamic acid from carbohydrate and a nitrogen source in a liquid culturing medium, said step consisting of culturing *Micrococcus glutamicus* under aerobic conditions in the culturing medium while maintaining said medium within a pH range of from 6 to 9.

15. A one-step method of directly producing, by reductive amination, a compound having an l-glutamate radical from carbohydrate and a nitrogen source in a liquid culturing medium, said step consisting of culturing a microorganism corresponding to ATCC No. 13032 under aerobic conditions in the culturing medium while maintaining said medium within a pH range of from 6 to 9.

References Cited in the file of this patent

UNITED STATES PATENTS

| | | |
|---|---|---|
| 2,749,279 | Smythe et al. | June 5, 1956 |
| 2,776,926 | Sharpe et al. | Jan. 8, 1957 |
| 2,789,936 | Kita | Apr. 23, 1957 |
| 2,798,839 | Huang | July 9, 1957 |